United States Patent
Tsui

[11] Patent Number: 5,237,226
[45] Date of Patent: Aug. 17, 1993

[54] APPARATUS FOR TRIGGERING A PLURALITY OF THYRISTOR DEVICES

[75] Inventor: Huai-Chou Tsui, Tainan City, Taiwan

[73] Assignee: Huai-Chi Wang Tsui, Taichung City, Taiwan

[21] Appl. No.: 843,305

[22] Filed: Feb. 28, 1992

Related U.S. Application Data

[63] Continuation-in-part of Ser. No. 591,287, Oct. 1, 1990, Pat. No. 5,115,156.

[51] Int. Cl.$^5$ ............... H03K 17/296; H03K 17/72; H03K 17/94
[52] U.S. Cl. ........................... 307/638; 323/241; 323/268; 307/640
[58] Field of Search ............ 307/638, 640, 645, 648; 323/241, 268, 269

[56] References Cited

U.S. PATENT DOCUMENTS 5,115,156  5/1992  Tsui ............................ 307/638

*Primary Examiner*—John S. Heyman
*Assistant Examiner*—Shawn Riley
*Attorney, Agent, or Firm*—Brumbaugh, Graves, Donohue & Raymond

[57] ABSTRACT

An apparatus for triggering a plurality of thyristor devices has a clock generator for producing a pulse train output and a digital counter for counting the number of pulses generated by the clock generator. The digital counter has a digital output which is received by a decoder. The decoder has a plurality of output lines, only one of which is in a high logic state at any time depending upon the digital output from the digital counter. A memory unit contains a plurality of digital control data, only one of which is accessed during the duration of the pulse train output. The memory unit has a plurality of memory data lines which are divided into several groups and which are used for reflecting the accessed one of the control data thereon. Each of a plurality of multiplexer units has a plurality of input select lines connected to a respective one of the groups of memory data lines of the memory unit, a plurality of input data lines connected to the output lines of the decoder, and an output terminal to be connected to a thyristor device. The input select lines of the multiplexer units control which one of the input data lines is to be reflected at the respective output terminal of the multiplexer units so as to trigger the respective thyristor device into conduction.

1 Claim, 6 Drawing Sheets

| NO. | A3~A0 | D15~D12 | D11~D8 | D7~D4 | D3~D0 |
|---|---|---|---|---|---|
| 1. | 0000 | 0110 | 0010 | 1010 | 0110 |
| 2. | 0001 | 0010 | 0100 | 0111 | 0001 |
| 3. | 0010 | 1010 | 1011 | 0010 | 0100 |
| 4. | 0011 | 0010 | 0001 | 0100 | 0010 |
| 5. | 0100 | 0100 | 0001 | 0010 | 0011 |
| 6. | 0101 | 0011 | 0010 | 0100 | 0101 |
| 7. | 0110 | 0100 | 0001 | 0010 | 0011 |
| 8. | 0111 | 1101 (13) | 0110 (6) | 0001 (1) | 0011 (3) |
| 9. | 1000 | 0001 | 0010 | 0101 | 0111 |
| 10. | 1001 | 0110 | 1001 | 0011 | 1010 |

FIG.5

APPARATUS FOR TRIGGERING A PLURALITY OF THYRISTOR DEVICES

This is a continuation-in-part application of U.S. patent application Ser. No. 07/591,287, filed on Oct. 1, 1990, U.S. Pat. No. 5,115,156.

BACKGROUND OF THE INVENTION

1. Field of the Invention

The invention relates to thyristor devices, more particularly to an apparatus for triggering a plurality of thyristor devices into a conducting state.

2. Description of the Related Art

Referring to FIG. 1, which is a schematic electrical circuit diagram of an apparatus used to trigger a plurality of thyristor devices and which is disclosed in U.S. patent application Ser. No. 07/591,287 by the applicant, and to FIG. 2, which is a timing diagram illustrating the signal waveforms detected at different nodes of the circuit shown in FIG. 1, a rectifier circuit means (10) generates a full-wave rectified sinusoidal DC pulse signal from an AC supply input. The voltage signal at node (a) is the rectified pulse signal after it has passed through a resistor network. The voltage signal at node (a) serves as input to a Schmitt trigger (20). The output signal at node (b) of the Schmitt trigger (20) has a duration (T1) and is a pulse signal of constant amplitude which exists only when the voltage signal input thereto exceeds a certain DC voltage. The output signal at node (b) serves as input to a one-shot multivibrator (30). The output signal at node (c) of the one-shot multivibrator (30) is a delayed pulse signal having a duration (T2) which is shorter than the duration (T1).

A pulse generator (40) includes a toggle flip-flop (41), a clock generator (42) and a digital counter (43). The signal at node (c) triggers the flip-flop (41) so as to enable the clock generator (42) to generate a pulse train output at node (d). The digital counter (43) monitors the number of pulses produced by the clock generator (42). When the output bits (431) of the digital counter are at a high logic state, an AND logic gate (44) resets the digital counter (43) and the flip-flop (41). Once reset, the flip-flop (41) disables the clock generator (42). The clock generator (42) resumes the generation of the pulse train output when the flip-flop (41) is once more triggered by the next pulse signal at node (c).

The pulse train output at node (d) serves as input to an address counter (50). The address counter (50) has twelve output lines (Q11 to Q0). A memory unit (60) has eight data lines (D7-D0) and twelve address lines (A11 to A0) connected to the output lines (Q11 to Q0) of the address counter (50).

A decoder (70) has two input lines, which are connected to the most significant address lines (A11, A10) of the memory unit (60), and four output lines (f1-f4). The pulse outputs at the output lines (f1-f4) are shown in FIG. 2. A digital switch (80) has four 8-bit output sets (81-84) and eight input data lines connected to the data lines (D7-D0) of the memory unit (6). Each 8-bit output set (81-84) is selected according to the pulse output at the output lines (f1-f4). Once a particular output set (81-84) is selected, the logic states at the data lines (D7-D0) of the memory unit (60) are reflected at the selected output set. Each bit output of the four output sets (81-84) is connected to the gate electrode of a respective thyristor device (91) and supplies the triggering signal required to fire the thyristor device (91) into conduction. Each thyristor device (91) controls the passage of current from a power supply input through an electrical load (92).

Note that sixty-four memory spaces of the memory unit (60) are accessed each time a pulse train output is present at node (d) (there are sixty-four pulses in each pulse train output). Each of the thyristor devices (91) connected to the output sets (81-84) of the digital switch (80) therefore has sixteen trigger opportunities during each duration (T1). This triggering arrangement is not advisable for resistive loads (such as light bulbs) but is most favorable for inductive loads (such as motors). This is because inductive loads can improve the fluctuating current condition arising from this particular arrangement.

Although there are sixteen trigger opportunities available for each thyristor device (91), only one trigger opportunity is required so as to trigger the thyristor device (91) into conduction and maintain the same in a conducting state for the remainder of the duration (T1). The apparatus shown in FIG. 1 therefore has a relatively large memory requirement and makes inefficient use of said memory requirement. Furthermore, the apparatus shown in FIG. 1 is inadvisable for use in triggering a small number of thyristor devices.

SUMMARY OF THE INVENTION

Therefore, the objective of the present invention is to provide an improved apparatus for triggering a plurality of thyristor devices at different firing angles, which apparatus has a lower memory requirement, makes more efficient use of memory space, and is ideal for triggering a smaller number of thyristor devices.

Accordingly, the preferred embodiment of an apparatus for triggering a plurality of thyristor devices of the present invention includes a full-wave rectifier circuit means having a sinusoidal pulse output, a Schmitt trigger circuit means for generating a constant amplitude pulse signal when the sinusoidal pulse output exceeds a certain triggering level, a pulse generator means for generating a predetermined number of clock pulses within the duration of the constant amplitude pulse signal, an address counter means activated by the pulse generator means and having a first digital output, and a memory means for storing a plurality of digital control data, said memory means having a plurality of address lines for receiving the first digital output and a plurality of memory data lines for reflecting one of the digital control data according to the first digital output, characterized by:

said pulse generator means including a clock generator for producing a pulse train output within the duration of the constant amplitude pulse signal, and a digital counter for receiving the pulse train output from the clock generator and generating a second digital output corresponding to the number of clock pulses received from the clock generator, said digital counter resetting the clock generator and activating the address counter to increment the first digital output when the clock generator has generated the predetermined number of clock pulses;

a decoder means having a plurality of decoder input lines for receiving the second digital output and further having a plurality of output lines, only one of the output lines being in a high logic state at any time depending upon the second digital output;

said memory data lines of the memory means being divided into several groups; and a plurality of multiplexer units, each of the multiplexer units having a plurality of input select lines connected to a respective one of the groups of memory data lines of the memory means, a plurality of input data lines connected to the output lines of the decoder means, and an output terminal to be connected to a thyristor device. The input select lines of the multiplexer units control which one of the input data lines is to be reflected at the respective output terminal of the multiplexer units so as to trigger the respective thyristor device into conduction.

BRIEF DESCRIPTION OF THE DRAWINGS

Other features and advantages of this invention will become apparent in the following detailed description of the preferred embodiment, with reference to the accompanying drawings, in which:

FIG. 5 is a table showing the contents of the first ten memory spaces of a memory unit of the apparatus shown in FIG. 3.

DETAILED DESCRIPTION OF THE PREFERRED EMBODIMENT

Figure 3:
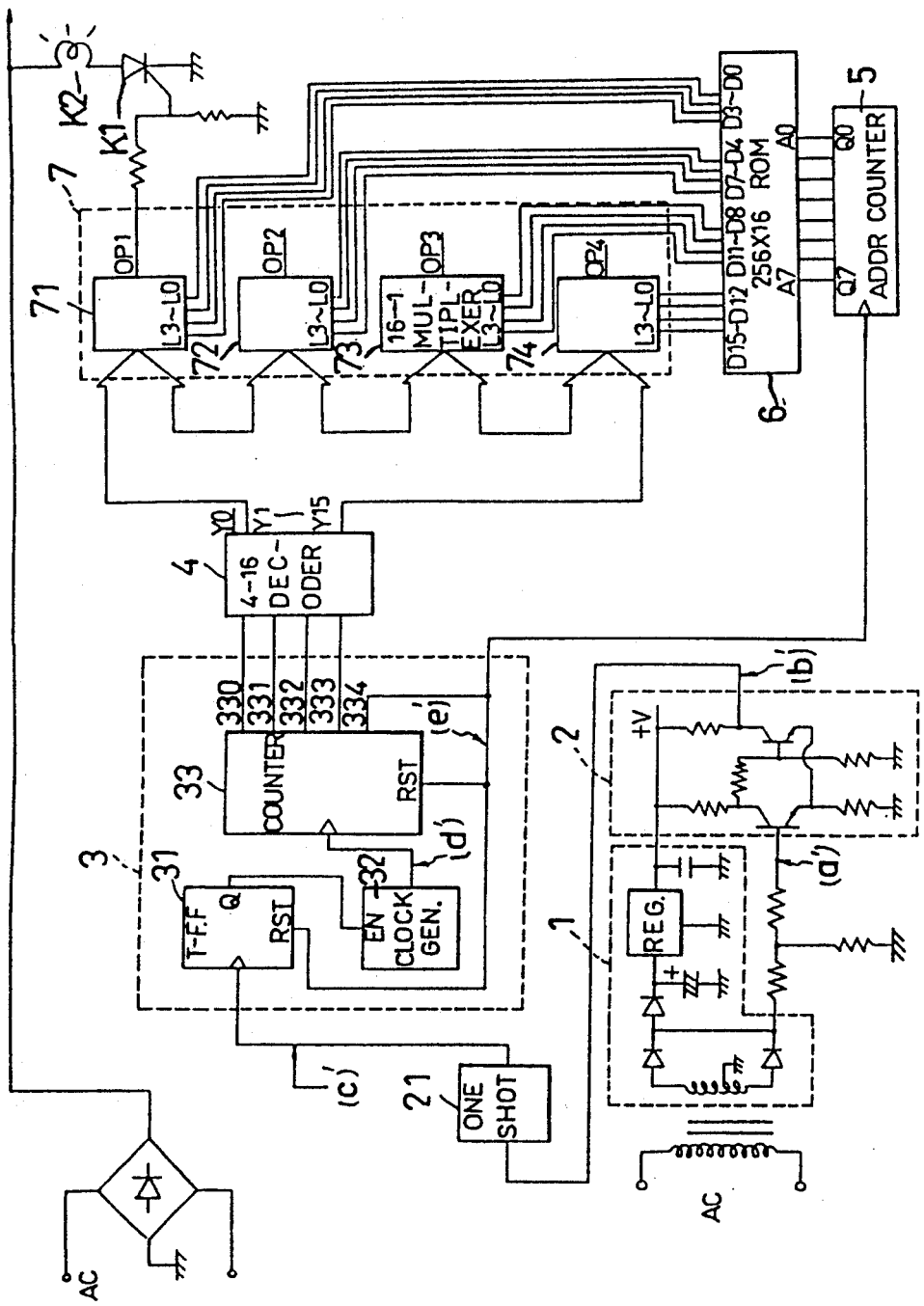
FIG. 3 is a schematic electrical circuit diagram of the preferred embodiment of an apparatus for triggering a plurality of thyristor devices according to the present invention.
Figure 4:
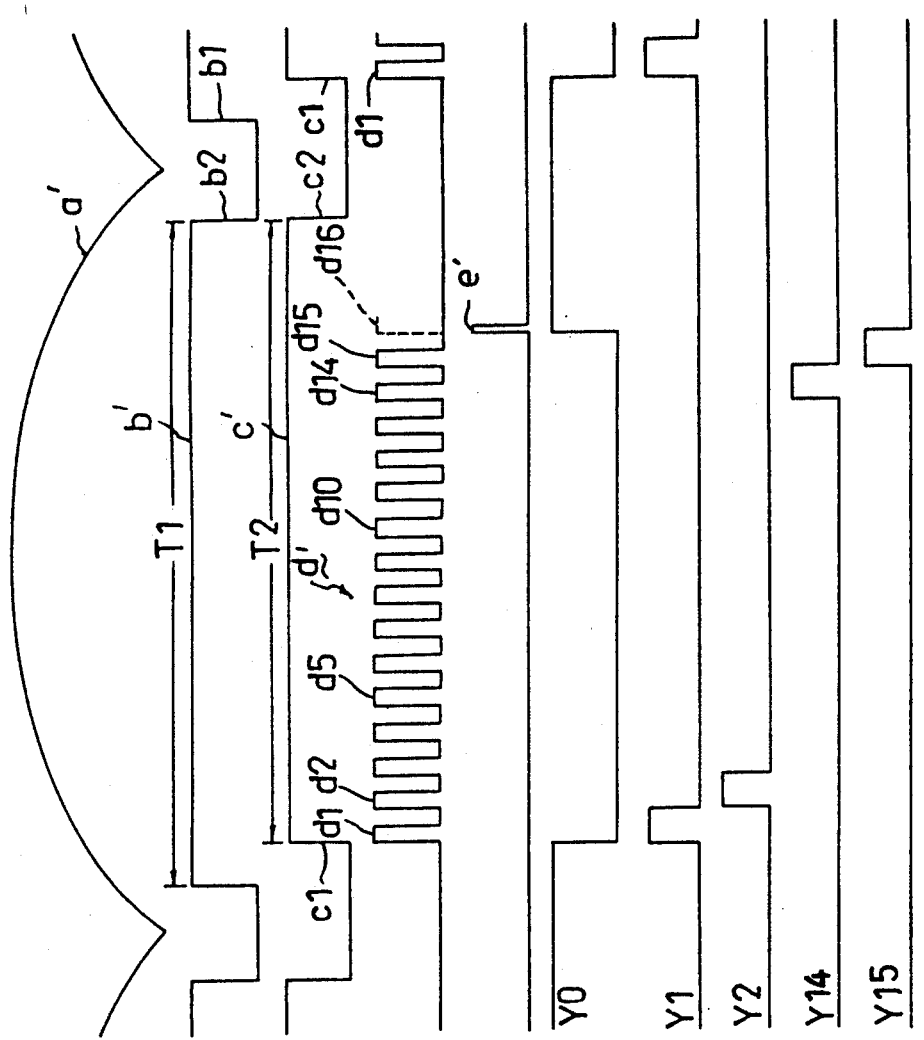
FIG. 4 is a timing diagram illustrating the signal waveforms at different nodes of the circuit shown in FIG. 3.

Referring to FIGS. 3 and 4, the preferred embodiment of a trigger apparatus according to the present invention is shown to comprise a rectifier circuit means (1), a Schmitt trigger (2), a one-shot multivibrator (21), a pulse generator (3), a decoder (4), an address counter (5), a memory unit (6) and a multiplexer set (7).

The rectifier circuit means (1) generates a full-wave rectified sinusoidal DC pulse signal from an AC supply input. The voltage signal at node (a') is the rectified pulse signal after it has passed through a resistor network. The voltage signal at node (a') serves as input to the Schmitt trigger (2). The output signal at node (b') of the Schmitt trigger (20) has a leading edge (b1), a falling edge (b2) and a duration (T1) and is a pulse signal of constant amplitude which is present only when the voltage signal input thereto exceeds a certain DC voltage.

The output signal at node (b') serves as input to the one-shot multivibrator (21). The output signal at node (c') of the one-shot multivibrator (21) is a delayed pulse signal having a duration (T2) which is shorter than the duration (T1), a delayed leading edge (c1) as compared to leading edge (b1), and a falling edge (c2) concurrent with the falling edge (b2).

The pulse generator (3) comprises a toggle flip-flop (31), a clock generator (32) and a digital counter (33). The leading edge (c1) of the pulse signal at node (c') triggers the flip-flop (31) to enable the clock generator (32) so as to generate a pulse train output at node (d'), which pulse train output is within the duration (T2) of the pulse signal at node (c'). The digital counter (33) monitors the number of pulses produced by the clock generator (32). In the preferred embodiment, the digital counter (33) has five output lines (330-334). The most significant output line (334) is connected to the reset pins of the flip-flop (31) and the digital counter (33). After fifteen pulses (d1-d15) have been produced by the clock generator (32), each of the least significant output lines (330-333) are at a high logic state. At the front portion of the sixteenth pulse (d16), the output line (334) changes to a high logic state so as to generate a reset signal at node (e') to the digital counter (33) and the flip-flop (31). Once reset, the flip-flop (31) disables the clock generator (32). The clock generator (32) resumes the generation of the pulse train output when the flip-flop (31) is once more triggered by the leading edge (c1) of the next pulse signal at node (c').

The decoder (4) is a 4-to-16 line decoder having four decoder input lines connected to the output lines (330-333) of the digital counter (33) and sixteen output lines (Y0-Y15). The signal waveforms at the output lines (Y0, Y1, Y2, Y14, Y15) of the decoder (4) are shown in FIG. 4. The output line (Y0) is at a low logic state during the duration of the pulse train output at node (d'). In the preferred embodiment, the output line (Y0) is left hanging and is not connected to any of the remaining circuit components. The output line (Y1) is at a high logic state when the decoder (4) receives a first pulse (d1) of the pulse train output. The output line (Y2) is at a high logic state when the decoder (4) receives a second pulse (d2) of the pulse train output. The output line (Y14) is at a high logic state when the decoder (4) receives a fourteenth pulse (d14) of the pulse train output. The output line (Y15) is at a high logic state when the decoder (4) receives a fifteenth pulse (d15) of the pulse train output. It has thus been shown that one of the output lines (Y1-Y15) correspondingly changes to a high logic state, depending upon the signals present at the output lines (330-333) of the digital counter (33).

The most significant output line (334) of the digital counter (33) is used to activate the address counter (5). The output of the address counter (5) is thus incremented every time a pulse signal is present at node (e'). In other words, the output of the address counter (5) is incremented by one unit at the end of each pulse train output. The address counter (5) has eight output lines (Q7-Q0). (Q7) is the most significant bit and (Q0) is the least significant bit. Thus, the output range of the address counter (5) is from 00000000 to 11111111 in binary digits, or from 00 to FF in hexadecimal notation.

The memory unit (6) is a ROM unit, an EPROM unit or a similar data storage device which can be programmed beforehand. The memory unit (6) has eight address lines (A7-A0), with (A7) being the most significant bit and (A0) being the least significant bit, and sixteen data lines (D15-D0), with (D15) being the most significant bit and (D0) being the least significant bit. The memory unit (6) preferably contains 256 digital control data (1 control data = 16 bits). The address lines (A7-A0) of the memory unit (6) are connected to the output lines (Q7-Q0) of the address counter (5). Thus, only one control data is accessed for each pulse train output at node (d'). When a particular control data in the memory unit (6) is accessed, said control data is reflected at the data lines (D15-D0).

The multiplexer set (7) comprises four 16-to-1 multiplexer units (71-74). The memory data lines (D15-D0) of the memory unit (6) are divided into four groups: (D0-D3), (D4-D7), (D8-D11) and (D12-D15). Each of the multiplexer units (71-74) has four input lines (L0-L3) connected to a respective one of the groups of memory data lines (D15-D0) of the memory unit (6). The signals at the input select lines (L0-L3) of the multiplexer units (71-74) are used to select which one of the signals present at the output lines (Y1-Y15) of the decoder (4) is to be reflected at a respective output terminal (OP1-OP4) of the multiplexer units (71-74). Each of the output terminals (OP1-OP4) is connected to the gate electrode of one thyristor device (K1) and supplies the triggering signal which is required to fire the thyristor device (K1) into conduction. Each thyristor device (K1) controls the passage of current from a power supply input through an electrical load (K2).

The following example illustrates the operation of the preferred embodiment:

FIG. 5 is a table which shows the first ten control data which are stored in the memory unit (6) at the addresses 00000000 (00) to 00001001 (0A) of the memory unit (6) [Since the most significant address lines (A7-A4) are all zero, only the least significant address lines (A3-A0) are shown in FIG. 5]. Address 00000111 or the eighth memory space of the memory unit (6) has been programmed to contain the control data 1101 0110 0001 0011 (or D613 in hexadecimal notation). When the eighth memory space of the memory unit (6) is accessed, the logic states at the output terminals (OP-1-OP4) are respectively equal to the logic states at the output lines (Y13, Y6, Y1, Y3) of the decoder (4).

Figure 6:
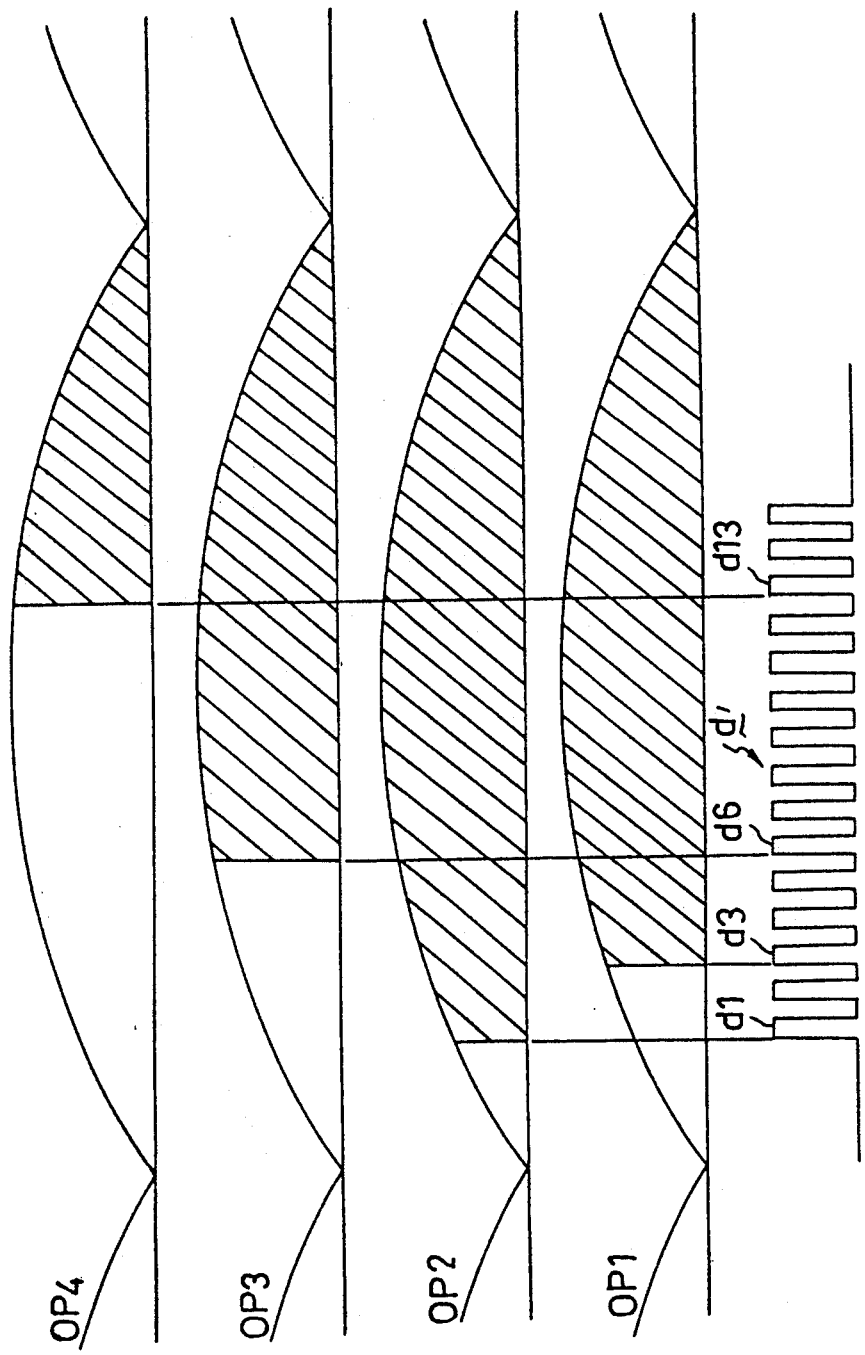
FIG. 6 is a timing diagram illustrating the triggering of four thyristor devices according to the contents of the memory unit, as shown in FIG. 5.

Each pulse train output consists of fifteen pulses (d1-d15). The output lines (Y13, Y6, Y1, Y3) thus respectively change to a high logic state when the digital counter (33) receives the pulses (d13, d6, d1, d3) from the clock generator (32). FIG. 6 is a timing diagram illustrating the triggering of four thyristor devices according to the contents in the eighth memory space of the memory unit (6), shown in FIG. 5. When the first pulse (d1) of the pulse train output is generated, the output terminal (OP2) of the multiplexer unit (72) changes to a high logic state so as to trigger into conduction the thyristor (K1) connected thereto. When the third pulse (d3) is generated, the output terminal (OP1) of the multiplexer unit (71) changes to a high logic state so as to trigger into conduction the thyristor (K1) connected thereto. When the sixth pulse (d6) is generated, the output terminal (OP3) of the multiplexer unit (73) changes to a high logic state so as to trigger into conduction the thyristor (K1) connected thereto. Finally, when the thirteenth pulse (d13) is generated, the output terminal (OP4) of the multiplexer unit (74) changes to a high logic state so as to trigger into conduction the thyristor (K1) connected thereto.

It has thus been shown that the preferred embodiment permits the triggering of a plurality of thyristor devices at different firing angles even though only one memory space of the memory unit is accessed during the duration of each pulse train output. Each of the thyristor devices (K1) connected to the output terminals (OP1-OP4) of the multiplexer units (71-74 has only one trigger opportunity for each pulse train output. Data in the memory unit (6) is used to control the firing angle of the thyristor devices (K1), as was shown in FIG. 6.

Figure 1:
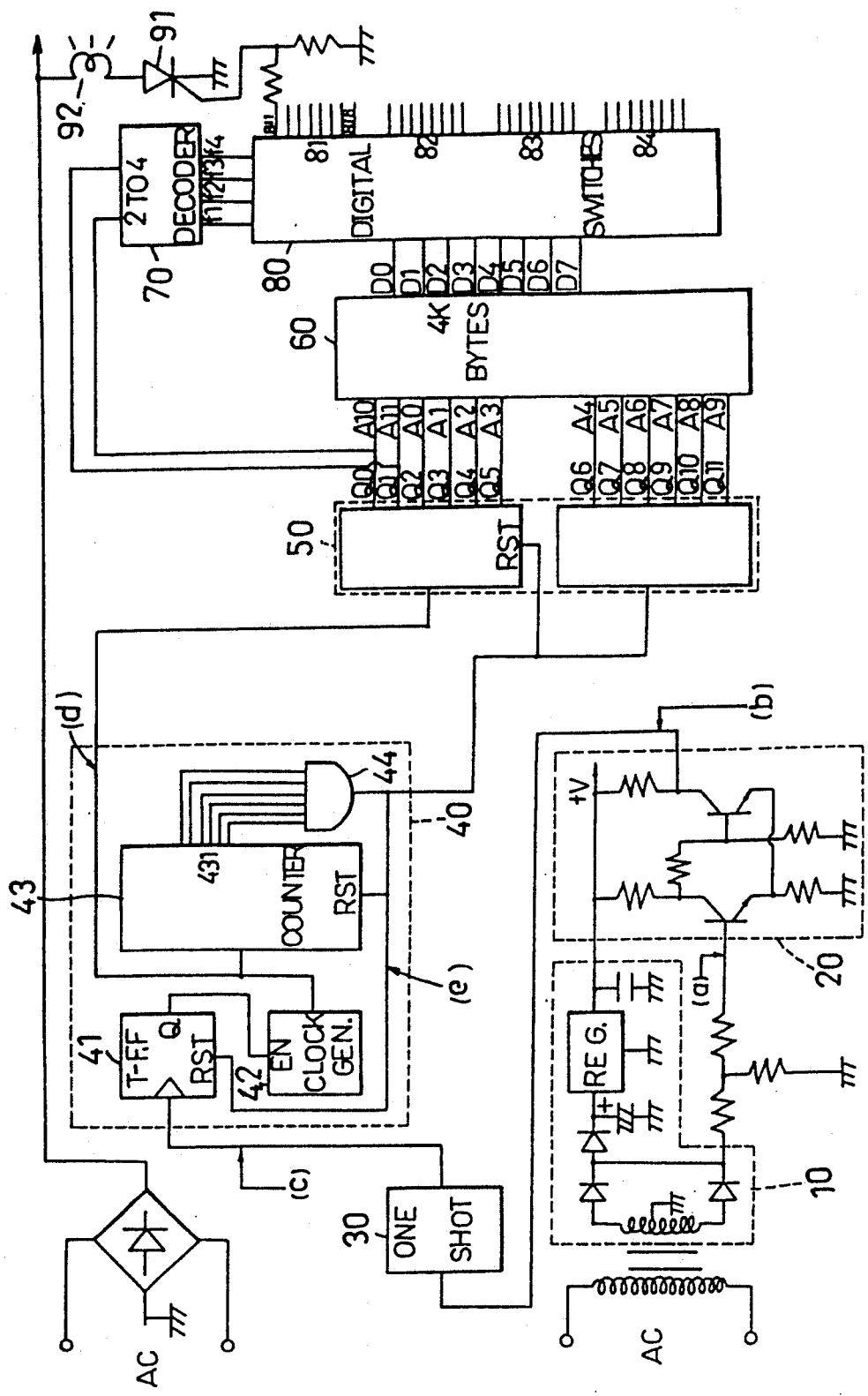
FIG. 1 is a schematic electrical circuit diagram of an apparatus for triggering a plurality of thyristor devices, which apparatus was disclosed in U.S. patent application Ser. No. 07/591,287 now U.S. Pat. No. 5,115,156.
Figure 2:
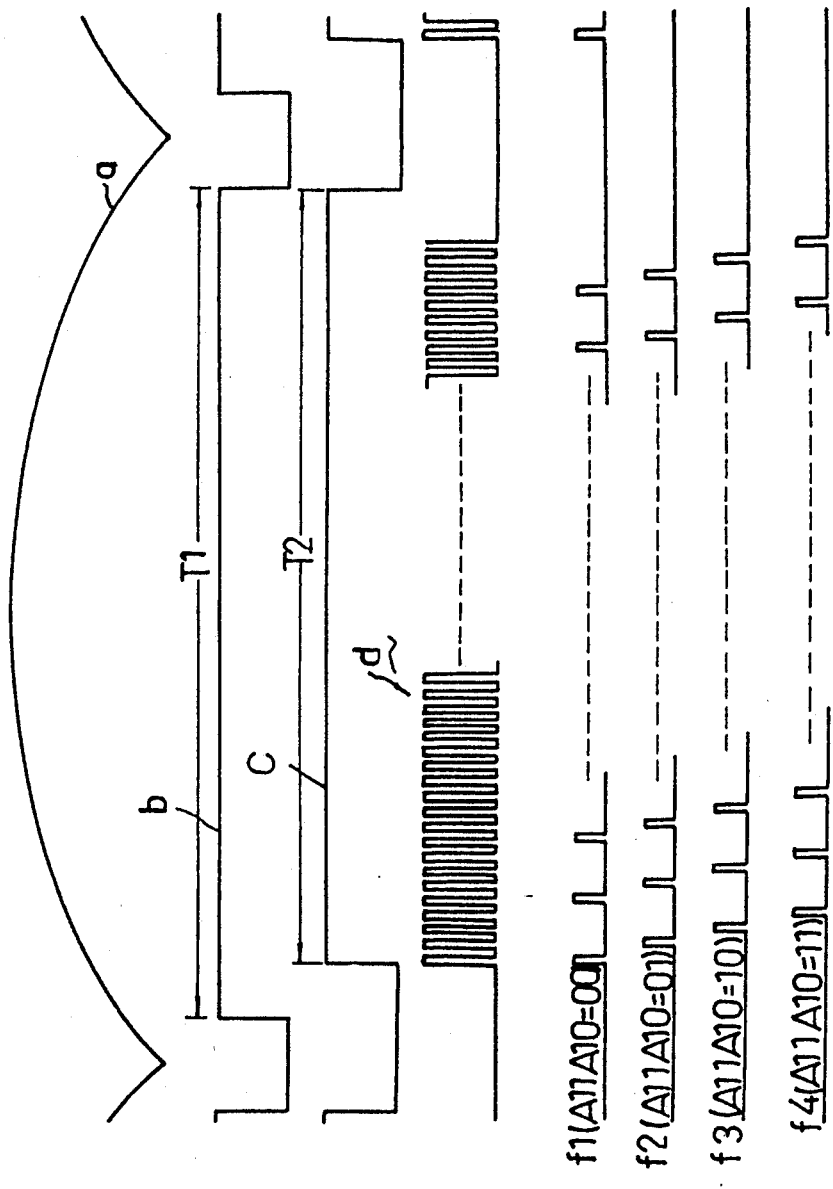
FIG. 2 is a timing diagram illustrating the signal waveforms detected at different nodes of the circuit shown in FIG. 1.

In the preferred embodiment, the output of the address counter (5) is incremented by one unit at the end of each pulse train output, regardless of the number of pulses present in each pulse train output. The address counter (5) tells the memory unit (6) when to send out the control data stored in the succeeding memory space. Another difference between the preferred embodiment and the apparatus shown in FIG. 1 is that in the latter, the number of memory spaces accessed during each pulse train output corresponds to the number of pulses present in each pulse train output. Therefore, assuming that a 1 K memory unit is used in the conventional apparatus and that each pulse train output consists of sixteen pulses, sixteen memory spaces are accessed during each pulse train output. Thus, only sixty-four pulse train outputs are needed before the end of the memory unit is reached (The operating cycle of the conventional apparatus is therefore equal to sixty-four pulse train outputs). In the preferred embodiment, assuming that a 1 K memory unit is also used and that each pulse train output also consists of sixteen pulses, since only one memory space is accessed during each pulse train output, the operating cycle of the preferred embodiment is therefore equal to 1024 pulse train outputs. The operating cycle of the preferred embodiment is therefore much longer than that of the conventional trigger apparatus. The memory requirement of the preferred embodiment is also correspondingly lower than that of the prior art.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An apparatus for triggering a plurality of thyristor devices into conduction, including a full-wave rectifier circuit means having a sinusoidal pulse output, a Schmitt trigger circuit means for generating a constant amplitude pulse signal when said sinusoidal pulse output exceeds a certain triggering level, a pulse generator means for generating a predetermined number of clock pulses within the duration of said constant amplitude pulse signal, an address counter means activated by said pulse generator means and having a first digital output, and a memory means for storing a plurality of digital control data, said memory means having a plurality of address lines for receiving said first digital output and a plurality of memory data lines for reflecting one of said digital control data according to said first digital output, characterized by:

said pulse generator means including a clock generator for producing a pulse train output within the duration of said constant amplitude pulse signal, and a digital counter for receiving said pulse train output from said clock generator and generating a second digital output corresponding to the number of clock pulses received from said clock generator, said digital counter resetting said clock generator and activating said address counter to increment said first digital output when said clock generator has generated said predetermined number of clock pulses;

a decoder means having a plurality of decoder input lines for receiving said second digital output and further having a plurality of output lines, only one of said output lines being in a high logic state at any time depending upon said second digital output;

said memory data lines of said memory means being divided into several groups; and a plurality of multiplexer units, each of said multiplexer units having a plurality of input select lines connected to a respective one of said groups of said memory data lines of said memory means, a plurality of input data lines connected to said output lines of said decoder means, and an output terminal to be connected to a thyristor device; said input select lines of said multiplexer units controlling which one of said input data lines is to be reflected at the respective said output terminal of said multiplexer units so as to trigger the respective thyristor device into conduction.

* * * * *